No. 764,330. PATENTED JULY 5, 1904.
J. A. ANDERSON.
RAWHIDE BUSHING.
APPLICATION FILED APR. 11, 1904.
NO MODEL.
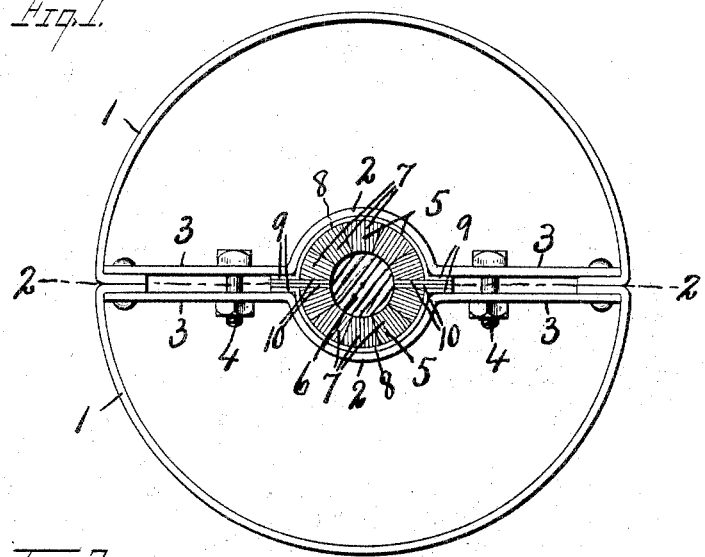
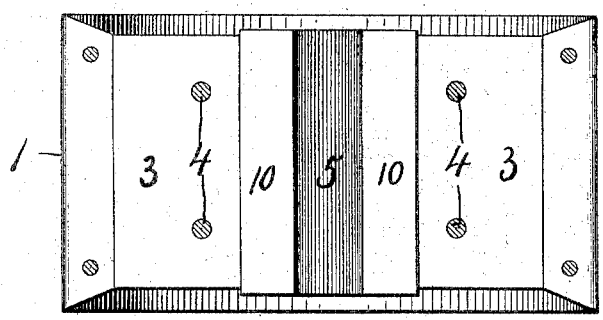
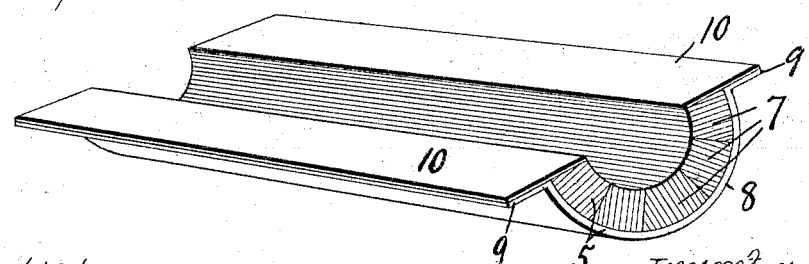
Witnesses:
F. E. Arthur
B. E. Robinson
Inventor:
James A. Anderson
By Howard P. Denison
Attorney.

No. 764,330.

Patented July 5, 1904.

UNITED STATES PATENT OFFICE.

JAMES A. ANDERSON, OF SYRACUSE, NEW YORK, ASSIGNOR TO SYRACUSE RAWHIDE MANUFACTURING COMPANY, OF SYRACUSE, NEW YORK, A CORPORATION OF NEW YORK.

RAWHIDE BUSHING.

SPECIFICATION forming part of Letters Patent No. 764,330, dated July 5, 1904.

Application filed April 11, 1904. Serial No. 202,561. (No model.)

*To all whom it may concern:*

Be it known that I, JAMES A. ANDERSON, of Syracuse, in the county of Onondaga, in the State of New York, have invented new and useful Improvements in Rawhide Bushings, of which the following, taken in connection with the accompanying drawings, is a full, clear, and exact description.

This invention relates to improvements in rawhide bushings for split pulleys in which the bushing is composed of two similar half-sections, each made up of a series of rawhide strips cemented or otherwise secured together face to face and edgewise with reference to the shaft or part upon which the bushing is mounted. These laminated semicylindrical bushing-sections, in which the laminæ are disposed edgewise with reference to the shaft and hub of the wheel with which they are used, are found to possess great durability and gripping qualities without liability of cutting or otherwise mutilating the shaft; but in the practical use of a bushing of this composition it is found that the circumferential strains to which the bushing is subjected tends to separate the cemented laminæ; and while my primary object is to provide a bushing made up of strips arranged edgewise with reference to the shaft a more specific object is to provide a suitable bond of the same material by which the integrity of the bushing or its half-sections is assured under the most severe strains, and when this bushing is made in sections for split pulleys the meeting edges are preferably formed with laterally-projecting flanges of the same material, which project between the meeting faces of the hub of the pulley for the purpose of locking the bushing firmly to the hub to prevent its independent rotation or torsional strains.

In the drawings, Figure 1 is an end elevation of a split pulley and my improved bushing mounted therein. Fig. 2 is a sectional view taken on line 2 2, Fig. 1. Fig. 3 is a perspective view of one of the half-sections of the bushing.

Similar reference characters indicate corresponding parts in all the views.

In order to demonstrate the practicability of my invention, I have shown a split pulley composed of rim-sections 1 and opposite hub-sections 2, which are united to their respective rim-sections by spokes 3, and the opposite hub-sections are drawn together by suitable clamping-bolts 4. The bushing is inserted in the hub 2 and comprises two opposite semicylindrical sections 5, each of which is composed of a series of parallel strips of rawhide cemented together face to face and arranged edgewise with reference to the shaft 6 and hub-sections 2, as best seen in Figs. 1 and 3. In order that these rawhide laminæ may be disposed in substantial radial lines or edgewise with reference to the shaft and hub, so as to afford the utmost strength and rigidity, they are first made up in segments 7 to conform to the radius of the bushing, and these segments are firmly united to each other by cementing or otherwise securing them together in the same manner that the laminæ are cemented or secured together, so as to form a unitary cylindrical section. The method of uniting these rawhide strips to form an integral body, although forming no part of my present invention, is essentially the same as that described in a former patent, No. 416,370, issued December 3, 1889, in which the surfaces of the rawhide strips are harrowed or roughened and then cemented together under pressure until dry. This produces a strong and durable bushing and is sufficient under ordinary usage; but I have found that when the bushings are used in connection with large pulleys or on comparatively small shafts, where the strain is excessive for bushings of any make, the laminations are liable to separate, and in order to obviate this I provide a semicylindrical bond 8 of the same material, covering the entire outer surface of each section, and this bond is usually made of a single sheet of rawhide, which is applied to the periphery of the bushing proper and permanently secured thereto by cementing or other means, so as to form a unitary part of the bushing. This external bond or cover is extended in opposite directions from the laminated parts of the bushing sufficient to form flanges 9, which project radially and outwardly from the meeting edges. Upon the meeting faces of the semicylindrical bushing-sections are secured additional rawhide strips or plates 10, which in this instance overlap upon the flanges 9, so as to tie the meeting edges or flanges 9 to the main laminated body of the bushing, said rawhide plates or strips 10 being cemented to the adjacent parts of the flange 9 and laminated parts of the bushing and in reality forms one of the laminæ.

In assembling the semicylindrical bushing-sections in the hub or upon the shaft the laterally-projecting flanges of each section are arranged face to face and between the meeting edges of the hub-sections, which latter operate to draw the bushing-sections upon the shaft when the clamping-bolts 4 are tightened, and it is apparent upon reference to Fig. 1 that owing to the fact that the meeting edges of the hub engage the flanges 9 of the integral bond 8 the strain is directly upon the bond, which tends to draw the laminæ into closer contact and avoids any liability of separating the rawhide strips of the bushing one from the other when in actual use.

This bushing may be used for either tight or loose pulleys, and when used in connection with a loose pulley it renders its operation substantially noiseless and at the same time being softer than the iron of the shaft it avoids cutting of the shaft, but is sufficiently tenacious to prevent being mutilated by the shaft or hub of the wheel.

In some instances I may choose to make the laminæ of the main body of the bushing of strips of hardwood or other material which has considerable durability and gripping quality and to bind these strips into a unitary body by a rawhide casing or bond, as 8. Therefore I do not limit myself to the use of rawhide strips in the composition of the bushing-sections.

Having thus described my invention, what I claim, and desire to secure by Letters Patent, is—

1. A bushing comprising a series of strips arranged face to face to form a cylindrical body with the strips disposed in radial planes, and a casing or bond of rawhide securely applied to the periphery of the bushing.

2. A bushing comprising two semicylindrical sections each composed of a series of strips cemented together face to face in substantially radial lines and a bond of rawhide securely applied to each of said sections.

3. A bushing comprising two semicylindrical sections each composed of a series of strips of rawhide cemented together face to face, and a sheet of rawhide securely applied to the periphery of each of the sections.

4. A bushing comprising two semicylindrical sections each composed of a series of strips of rawhide cemented together face to face, and a sheet of rawhide securely applied to the periphery of each of the sections, and additional strips or plates of rawhide secured to the meeting faces of the bushing-sections and also secured to the meeting faces of the rawhide casing or bond.

5. A bushing comprising two semicylindrical sections each composed of a series of rawhide strips secured together face to face and disposed in substantially radial planes, and a sheet of rawhide securely applied to the periphery of each section and having laterally-projecting flanges at their meeting edges.

6. A bushing comprising two semicylindrical sections each composed of a series of rawhide strips secured together face to face and disposed in substantially radial planes, and a sheet of rawhide securely applied to the periphery of each section and having laterally-projecting flanges at their meeting edges and additional plates of rawhide secured to the meeting edges of the bushing-sections and also secured to the adjacent flanges of the outer case.

In witness whereof I have hereunto set my hand this 7th day of April, 1904.

JAMES A. ANDERSON.

Witnesses:
MILDRED M. NOTT,
HOWARD P. DENISON.